United States Patent

Bloor

Patent Number: 5,345,685
Date of Patent: Sep. 13, 1994

[54] STRATA MOVEMENT INDICATOR

[75] Inventor: Alan S. Bloor, Stafford, England

[73] Assignee: Coal Industry (Patents) Limited, London, England

[21] Appl. No.: 80,511

[22] Filed: Jun. 24, 1993

[30] Foreign Application Priority Data

Jul. 15, 1992 [GB] United Kingdom ............... 9215082

[51] Int. Cl.$^5$ .................. E21B 47/00; G01B 5/30
[52] U.S. Cl. .................. 33/308; 33/1 H; 33/787; 116/281; 116/283
[58] Field of Search ............ 33/1 H, 304, 308, 347, 33/391, 544, 624, 783, 787, 790; 73/84, 784; 116/212, 281, 283, DIG. 34

[56] References Cited

U.S. PATENT DOCUMENTS

| 2,725,843 | 12/1955 | Kosai | 116/212 |
| 3,457,778 | 7/1969 | Gill et al. | 73/784 |
| 3,538,608 | 11/1970 | Bronson | 33/1 H |
| 3,568,326 | 3/1971 | Dadds | 33/1 H |
| 4,070,906 | 1/1978 | Rupert et al. | 73/784 |
| 4,348,635 | 9/1982 | Wright et al. | 73/784 |
| 4,509,449 | 4/1985 | Chalmers | 116/281 |
| 4,514,905 | 5/1985 | Lutzens | 33/787 |
| 4,539,851 | 9/1985 | Lutenegger | 73/784 |
| 5,105,881 | 4/1992 | Thoms et al. | 73/784 |

FOREIGN PATENT DOCUMENTS

| 2011911 | 9/1971 | Fed. Rep. of Germany | 33/787 |
| 1318344 | 5/1973 | United Kingdom . |
| 1453260 | 10/1976 | United Kingdom . |
| 2253707 | 9/1992 | United Kingdom . |

Primary Examiner—William A. Cuchlinski, Jr.
Assistant Examiner—G. Bradley Bennett
Attorney, Agent, or Firm—Stevens, Davis, Miller & Mosher

[57] ABSTRACT

A strata movement indicator includes at least two lengths of suspension wire respectively for remote and near anchors locatable in the same borehole. Each wire carries a cylinder provided with indicator markings, the cylinders being moveable with respect to one another and to a reference tube fixed in the mouth of the borehole. Relative movement of the cylinders with respect to one another and/or to the reference tube indicates the degree of strata movement.

8 Claims, 1 Drawing Sheet

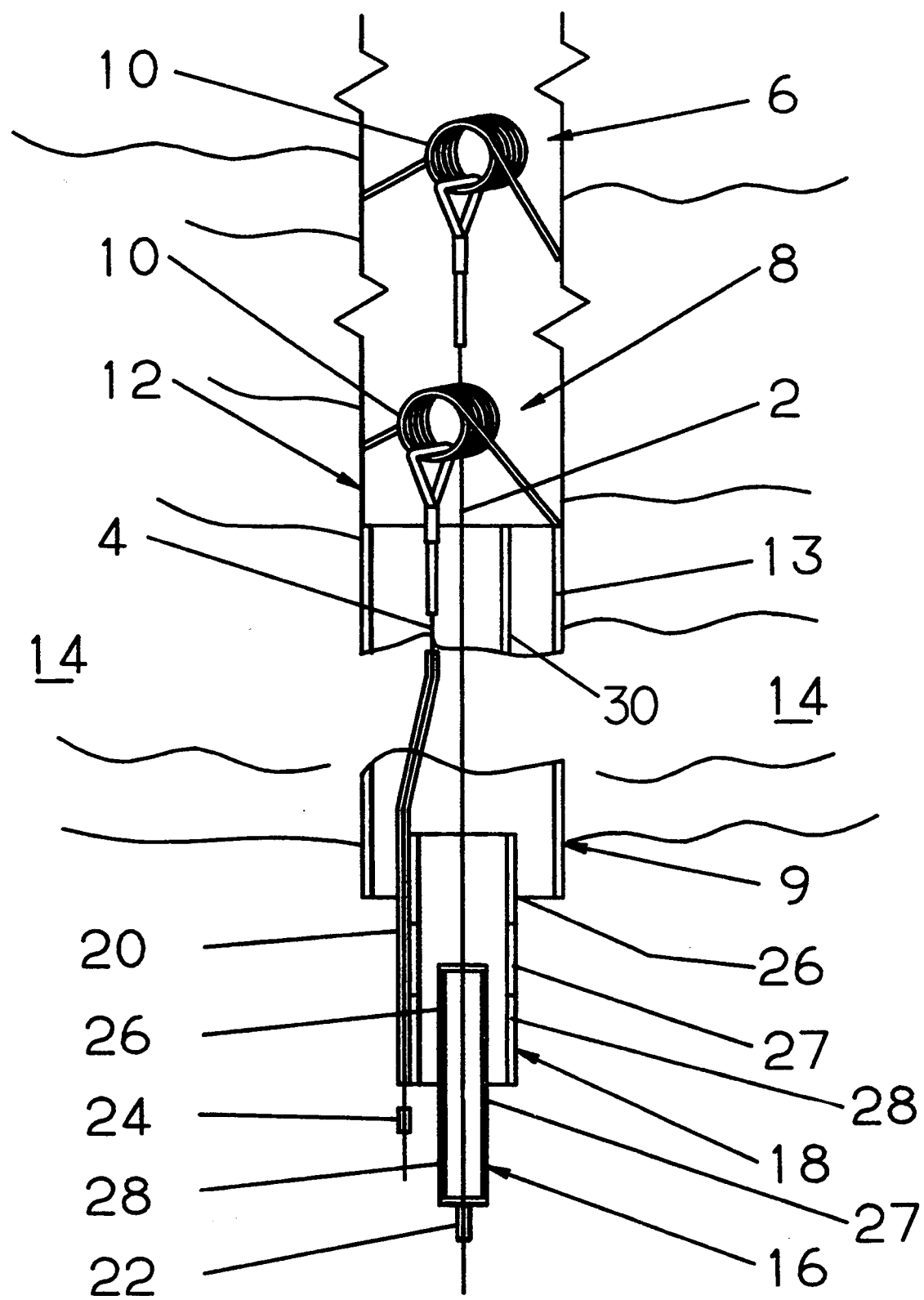

STRATA MOVEMENT INDICATOR

BACKGROUND OF THE INVENTION

This invention concerns a strata movement indicator.

The present invention has particular, but not exclusive, reference to an indicator for use in underground mines, for example coal mines, in association with rock bolted strata.

The rock bolting of strata defining roadways or galleries in underground mines has long been known and applied, dependent upon the nature of the strata and the method of working the mineral seams. Although it has found widespread application for example in the United States, it has not been until more recent times that it has found favor in the United Kingdom and Europe where more conventional supports, for example arches, have predominated. By virtue of their distortion or displacement, such supports give a readily observable indication as to the manner in which movement within the surrounding strata is taking place.

However, when employing rock bolts alone for reinforcement, because they are embedded within the strata there is no readily external visual indication as to the movement of the strata.

In assignee's co-pending British Patent Application No 91 05296.9 we describe a simple yet effective strata movement indicator which includes the features of an anchor at the remote end of a borehole and a reference tube at the near end of the same borehole. The anchor is connected to a banded indicator by means of a wire. Expansion of the strata causes the indicator to move relative to the reference tube by an amount equal to the net expansion between the anchor and the reference tube. While the indicator performs satisfactorily, it is incapable of focusing upon the source of the strata movement.

SUMMARY OF THE INVENTION

It is an object of the present invention to provide an improved strata movement indicator.

According to the invention a strata movement indicator includes at least two flexible elongate suspension members, anchors for anchoring the suspension members at spaced apart locations in use within a borehole formed in the strata, a guide through which the members pass, the guide being fixable in use within the borehole, and an indicator element held on each suspension member and movable in relation to the guide and to one another, the movement of each element being indicative of strata movement.

Each flexible elongate suspension member may conveniently be a length of wire cable, and each anchor may be a wire torsion spring engageable directly with the wall of the borehole.

The guide may be a relatively short tubular sleeve extending in use a short distance within the borehole and may be split longitudinally affording a spring effect, whereby the sleeve may be sprung into the borehole and frictionally fixed therein.

Each indicator element may be cylindrical in form and slidable in the manner of a piston relative to the guide. The indicator element is preferably marked to indicate the degree of extension/retraction thereof within the guide and thus the degree of strata movement. The marking may be achieved by the use of chromatic banding, conveniently the colors being red, orange, and green to represent the degrees of strata movement, red being indicative of a potentially dangerous condition in which urgent and substantive action is required to avoid failure of the roadway, green representing an acceptable condition, and orange indicating an interim condition in which moderate remedial action needs to be taken.

The indicator element for the anchor located remotely from the mouth of the borehole may be of relatively smaller size than that for the anchor nearer the mouth, the one being slidable within the other and within the guide in the manner of pistons.

The invention includes the provision of more than two anchors for disposition in the borehole at spaced apart locations therealong, together with the same number of indicator elements to provide indications as to strata movement along the length of the borehole.

BRIEF DESCRIPTION OF THE DRAWINGS

By way of example only, a strata movement indicator according to the present invention is described below with reference to the accompanying drawing which is a diagrammatic view of a borehole with a strata movement indicator in situ within the borehole.

DETAILED DESCRIPTION OF THE INVENTION

Referring to the drawing a strata movement indicator includes two suspension wires 2, 4 connected respectively to a remote anchor 6 and a near anchor 8, each anchor being in the form of a coil spring 10. The anchors 6, 8 are fixedly located in a borehole 12 in strata 14 at spaced locations therealong.

The indicator further comprises a guide in the form of a reference tube 13 secured in place within the mouth 9 of the borehole 12.

Suspended respectively on each wire 2, 4 is an indicator element in the form of a cylinder 16, 18 the cylinder 16 being of smaller diameter than cylinder 18 and being slidable therewithin. The larger diameter cylinder 18 is slidable within the reference tube 13 and carries a guide 20 on its outer surface for the suspension wire 4 in order that it may be kept separate from the wire 2 and to provide a suspension point. The cylinders 16, 18 are held on their wires 2, 4 by ferrules 22, 24.

Each cylinder 16, 18 has on its outer surface color bands, 26, 27 and 28 being respectively green, orange and red.

In practice the strata movement indicator of the present invention is emplaced in the following manner, given that the borehole 12 has previously been formed in the appropriate location, for example adjacent to a heading in a roadway in which rock bolting has been or is in progress. The reference tube 13 is first inserted into the borehole 12 and pressed home to sit firmly within the mouth 9 of the borehole 12 partially proud thereof. As indicated by reference numeral 30 the tube 13 may be split longitudinally so as to be sprung into the borehole and frictionally fit therein. An insertion rod (not shown) is used to introduce the anchor 6 carried by the wire 2 through the tube 6 and into the borehole 12. With a slight tension on the wire 2 the insertion rod carries the anchor 6 to a position adjacent the inner end of the borehole 12 and there engages the wall of the borehole in sprung frictional fashion.

The insertion rod is used again to introduce the anchor 8 carried by wire 4 through the tube 6 and into the borehole 12. With a slight tension on the wire the insertion rod carries the anchor 8 to a position intermediate the inner end of the borehole 12 and the mouth 9 thereof.

The guide 20 of cylinder 18 of the indicator element is threaded onto the wire 4 which passes through the reference tube 13 until the top of the green band 26 aligns with the bottom edge of the tube 13. The ferrule 24 is then crimped to the wire 4 beneath the cylinder 18 to hold the cylinder in that initial position. The cylinder 16 of the indicator element is threaded onto the wire 2 which passes through the cylinder 18 and the tube 13 until the top of the green band aligns with the bottom edge of the cylinder 18. The date and time of installation of the strata movement indicator are then recorded together with the length of the borehole drilled in order to establish a datum against which any movement of the strata can be monitored.

As dilation of the strata occurs due inter alia to the working of the mineral seams within the mine environs, the anchors 6, 8 will accordingly move and respectively carry the cylinder 18 further into the reference tube 13 and/or carry the cylinder 16 into the cylinder 18 thus obscuring the color bands on the cylinders sequentially dependent upon the severity and extent of the strata movement.

Interpretation of the movement of the indicator is important and for simplicity the meaning of the change in relative position of the two cylinders 16 and 18 and the reference tube 13 is given below.

In the event of there being expansion of the strata 14 beyond the remote anchor 6, the indicator will give no indication thereof, the relative positions of the cylinders 16 and 18 and the reference tube 13 remain unaltered.

If there should be expansion of the strata between the remote anchor 6 and the near anchor 8, the cylinder 16 moves into the cylinder 18 which latter remains in the same position relative to the reference tube 13.

Expansion of the strata between the near anchor 8 and the reference tube 13, the cylinder 18 moves in relation to the reference tube 13 while the cylinder 16 remains stationary.

If there should be expansion throughout the length of the borehole 12, the cylinder 18 moves into the reference tube 13 by an amount equal to the expansion in the nearer part of the borehole 12, namely between the near anchor 8 and the mouth 9 of the borehole 12. At the same time, the cylinder 16 moves into the reference tube by the total amount of expansion in the borehole 12. The total is more easily assessed by adding the movements of the two cylinders.

In each of the above cases the degree of strata movement can be visually detected by inspection of the chromatic banding on the cylinders 16 and 18.

The indicator of the present invention thus provides a relatively simple and yet effective way of determining the strata movement in a mine environment. While the invention has been described in relation to an indicator having two anchors and thus two indicator elements, it is to be understood that more than two may be employed. Any limitation on the number of indicator elements will be dictated by the practicality of accommodating the same in the one borehole.

I claim:

1. A strata movement indicator for use in association with a borehole formed in strata, the indicator including at least two flexible elongate suspension members, anchors for anchoring the suspension members at spaced apart locations in use within the borehole formed, a guide through which the members pass, the guide being fixable in use within the borehole, and a cylindrical indicator element held on each suspension member and movable in relation to the guide and to one another in the manner of a piston, the movement of each element being indicative of strata movement.

2. An indicator according to claim 1 in which each flexible elongate suspension member is a length of wire cable.

3. An indicator according to claim 1 in which each anchor is a wire torsion spring engageable directly with the wall of the borehole.

4. An indicator according to claim 1 in which the guide is a short tubular sleeve extending in use a short distance within the borehole.

5. An indicator according to claim 4 in which the sleeve is split longitudinally thereof and is in use sprung into the borehole and frictionally fixed therein.

6. An indicator according to claim 1 in which each indicator element is marked to indicate the degree of movement relative to the guide.

7. An indicator according to claim 6 in which each indicator element is marked with chromatic banding.

8. An indicator according to claim 1 in which the cylindrical indicator element on one suspension member is mounted to slide within the cylindrical indicator element of the other suspension member.

* * * * *